(12) United States Patent
Birkigt

(10) Patent No.: US 10,018,085 B2
(45) Date of Patent: Jul. 10, 2018

(54) METHOD FOR PREVENTING A PREMATURE IGNITION IN AN INTERNAL COMBUSTION ENGINE AND INTERNAL COMBUSTION ENGINE

(71) Applicant: VOLKSWAGEN AKTIENGESELLSCHAFT, Wolfsburg (DE)

(72) Inventor: Andreas Birkigt, Wolfsburg (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 515 days.

(21) Appl. No.: 14/569,697

(22) Filed: Dec. 13, 2014

(65) Prior Publication Data
US 2015/0114349 A1 Apr. 30, 2015

Related U.S. Application Data

(63) Continuation of application No. PCT/EP2013/058508, filed on Apr. 24, 2013.

(30) Foreign Application Priority Data

Jun. 14, 2012 (DE) .................. 10 2012 011 834

(51) Int. Cl.
*F01M 13/02* (2006.01)
*F01M 13/00* (2006.01)
(Continued)

(52) U.S. Cl.
CPC .......... *F01M 13/022* (2013.01); *F01M 13/00* (2013.01); *F02P 5/152* (2013.01);
(Continued)

(58) Field of Classification Search
CPC ...... F02D 35/027; F02D 35/028; F02D 37/02; F02D 43/04; F02P 11/02; F02P 5/152;
(Continued)

(56) References Cited

U.S. PATENT DOCUMENTS 3,839,996 A 10/1974 DeBiasse
4,849,897 A * 7/1989 Ciccarone .......... F02D 41/0007
123/564
(Continued)

FOREIGN PATENT DOCUMENTS

CN 1478174 A 2/2004
DE 201 03 874 U1 7/2002
(Continued)

OTHER PUBLICATIONS

Search Report issued by the German Patent and Trademark Office for German Patent Application No. DE 10 2012 011 834.1, dated Nov. 30, 2012.
(Continued)

*Primary Examiner* — Erick Solis
*Assistant Examiner* — Anthony L Bacon
(74) *Attorney, Agent, or Firm* — Manfred Beck, P.A.

(57) ABSTRACT

Methods for preventing a premature ignition of a cylinder charge in advance of a planned ignition point in an internal combustion engine are provided. In one method, a pressure in a crankcase of the internal combustion engine is adjusted so as to prevent lubricating oil constituents from being transported from the crankcase to a combustion chamber of a cylinder of the internal combustion engine due to a pressure ratio between the crankcase and the combustion chamber. In another method, an ignition point for a cylinder of the internal combustion engine is adjusted in a given operating range of the internal combustion engine in such a way that the adjusted ignition point brings about a knocking combustion in the cylinder. Internal combustion engines having a device for preventing a premature ignition of a cylinder charge in advance of a planned ignition point are also provided.

4 Claims, 2 Drawing Sheets

(51) Int. Cl.
*F02P 5/152* (2006.01)
*F02D 35/02* (2006.01)

(52) U.S. Cl.
CPC ............ *F01M 2013/0005* (2013.01); *F01M 2013/0083* (2013.01); *F01M 2013/0088* (2013.01); *F01M 2013/0094* (2013.01); *F01M 2013/027* (2013.01); *F02D 35/02* (2013.01); *F02D 2250/08* (2013.01); *Y02T 10/46* (2013.01)

(58) Field of Classification Search
CPC .... F02P 5/1523; F02P 5/1528; F01M 13/022; F01M 2013/0083; F01M 2013/0088; F01M 2013/0094; F01M 2013/027
See application file for complete search history.

(56) References Cited

U.S. PATENT DOCUMENTS

| | | | | |
|---|---|---|---|---|
| 5,622,053 | A * | 4/1997 | Freen | F02B 33/44 123/299 |
| 5,653,209 | A * | 8/1997 | Johansson | F02D 41/1497 123/435 |
| 6,360,587 | B1 * | 3/2002 | Noel | F02D 35/021 73/35.06 |
| 6,988,484 | B1 * | 1/2006 | Kujawa | F02P 5/1527 123/406.29 |
| 2003/0106543 | A1 | 6/2003 | Gschwindt et al. | |
| 2004/0099241 | A1 | 5/2004 | Kirchberger | |
| 2004/0112346 | A1 | 6/2004 | Ahlborn et al. | |
| 2005/0022795 | A1 | 2/2005 | Beyer et al. | |
| 2007/0044753 | A1 * | 3/2007 | Brehob | F02D 35/027 123/304 |
| 2008/0110443 | A1 | 5/2008 | Hirano | |
| 2011/0213538 | A1 * | 9/2011 | Amann | F02D 37/02 701/102 |
| 2011/0239965 | A1 | 10/2011 | Ingelfinger et al. | |
| 2011/0265761 | A1 * | 11/2011 | Amann | F02D 35/027 123/406.11 |
| 2012/0271533 | A1 * | 10/2012 | Shishime | F02D 35/021 701/105 |
| 2013/0047956 | A1 * | 2/2013 | Davis | F02P 5/152 123/406.11 |
| 2013/0291843 | A1 | 11/2013 | Kitayama et al. | |

FOREIGN PATENT DOCUMENTS

| | | | |
|---|---|---|---|
| DE | 10154666 A1 | 5/2003 | |
| DE | 103 20 054 A1 | 11/2004 | |
| DE | 20 2007 013 145 U1 | 12/2007 | |
| DE | 20 2006 017 813 U1 | 4/2008 | |
| DE | 10 2008 038 102 B4 | 5/2010 | |
| DE | 10 2008 061 057 A1 | 6/2010 | |
| EP | 1 310 639 A1 | 5/2003 | |
| JP | WO 2013132613 A1 * | 9/2013 | ............. F02P 5/152 |
| WO | 20121095953 A1 | 7/2012 | |

OTHER PUBLICATIONS

International Search Report for International Application No. PCT/EP2013/058508 and translation thereof, dated Jul. 31, 2013.
International Preliminary Report on Patentability for International Application No. PCT/EP2013/058508 including Written Opinion of the International Searching Authority and translation thereof, dated Dec. 16, 2014.

* cited by examiner

METHOD FOR PREVENTING A PREMATURE IGNITION IN AN INTERNAL COMBUSTION ENGINE AND INTERNAL COMBUSTION ENGINE

CROSS-REFERENCE TO RELATED APPLICATIONS

This application is a continuation, under 35 U.S.C. § 120, of copending International Application No. PCT/EP2013/058508, filed Apr. 24, 2013, which designated the United States; this application also claims the priority, under 35 U.S.C. § 119, of German Patent Application No. 10 2012 011 834.1, filed Jun. 14, 2012; the prior applications are herewith incorporated by reference in their entirety.

BACKGROUND OF THE INVENTION

Field of the Invention

The present invention relates to a method for preventing a premature ignition of a cylinder charge in advance of a planned ignition point in an internal combustion engine.

In order to reduce the fuel consumption of vehicles, such as automobiles or trucks, for example, internal combustion engines, especially spark-ignition engines, are being made smaller and supercharged by a compressor, for example a turbocharger. The reduction in the size of internal combustion engines is also referred to as "downsizing." In the wake of this downsizing of highly supercharged spark-ignition engines and in especially critical conditions, for example with poor fuel or high outdoor temperatures, low engine speeds and high engine loads can lead to a combustion anomaly referred to as premature ignition. Among other things, combustion chamber deposits, hot component temperatures and lubricating oil constituents can lead to such premature ignitions. The term "premature ignition" refers to uncontrolled ignition processes of a cylinder charge more or less significantly in advance of the planned ignition point. Due to the premature conversion of the air-fuel mixture and the additional compression, very high cylinder pressures can occur in the event of premature ignition. Due to the increased thermal state after combustion commences, a detonation with ensuing knocking combustion can often occur in this case. The simultaneous occurrence of these conditions can lead to cylinder pressures greater than 250 bar, thereby increasing internal combustion engine wear or possibly damaging the internal combustion engine, so that the internal combustion engine promptly fails. The occurrence of premature ignition is not usually heralded in any way in the preceding working cycles. FIG. 1 shows cylinder pressure profiles 1 of regular combustion processes and cylinder pressure profiles 2 of combustion processes with premature ignition. Here the cylinder pressure is plotted over the crankshaft angle for various cycles. Specifically, the cylinder pressure is plotted over the crankshaft angle after top dead center (° CA after TDC) for various cycles. As can be seen from FIG. 1, in the event of a premature ignition the cylinder pressure rises considerably due to the premature combustion, even during the compression phase before reaching top dead center. In contrast to auto-ignition, however, the premature ignition generally occurs only under specific prerequisite conditions. Firstly high compression temperatures are necessary, in order to initiate preliminary reactions followed by self-ignition. These temperatures are attained due to a combination of high compression ratios and high supercharging rates in turbocharged spark-ignition engines, for example. In addition, a sufficient period of time is needed for the initiation of preliminary reactions and self-ignition, so that a premature ignition can increasingly occur in an engine speed range of 1500-2500 rpm.

In this context German Patent DE 10 2008 038 102 B4 discloses a method for preventing a premature ignition of a fuel-air mixture in a cylinder chamber of an internal combustion engine operating on the spark-ignition principle and having a high compression ratio. In the method an associated cylinder internal pressure, and from this a combustion focal point of the respective cylinder for the working cycle currently in progress, is determined from a registered angular velocity profile of a crankshaft of the internal combustion engine. This is used to calculate any tendency to premature ignition to be expected in the succeeding working cycle, and if an angle in excess of an applicable threshold angle for the combustion focal point is detected for this preceding working cycle, an additional quantity of fuel is injected into the respective cylinder for the current working phase.

European Patent Application EP 1 310 639 A1 discloses a crankcase ventilation for an internal combustion engine with exhaust gas turbo-charging. The crankcase ventilation includes a first venting line, which is connected to the crankcase chamber on the one hand and to an inlet manifold of the internal combustion engine on the other, and a second venting line, which is connected to the crankcase chamber on the one hand and to the intake side of the compressor on the other. In the crankcase ventilation this serves to ensure that the vacuum in the crankcase chamber can be adjusted both in the supercharged mode and in the naturally aspirated mode of the internal combustion engine. Pressure regulators ensure that a constant vacuum is set in the crankcase chamber, which represents a reduced vacuum compared to the vacuum in the inlet manifold.

German Utility Model DE 20 2006 017 813 U1 relates to an internal combustion engine having a crankcase ventilation line. A crankcase pressure regulating valve, which serves to keep the pressure in the crankcase within a predefined pressure range, is provided in the venting line.

German Patent Application DE 103 20 054 A1 relates to a method and a device for operating an internal combustion engine having an inlet manifold and a venting duct of a ventilation system. In particular, the ventilation system may be a tank ventilation or a crankcase ventilation system. The venting duct is led to the inlet manifold of the internal combustion engine. A crankcase ventilation valve serves to limit the vacuum in the crankcase.

SUMMARY OF THE INVENTION

It is accordingly an object of the invention to provide methods for preventing a premature ignition of a cylinder charge in advance of a planned ignition point in an internal combustion engine and to provide corresponding internal combustion engines which overcome the disadvantages of the heretofore-known methods and internal combustion engines of this general type. It is in particular an object of the invention to prevent a premature ignition of a cylinder charge in advance of a planned ignition point in an internal combustion engine.

With the foregoing and other objects in view there is provided, in accordance with the invention, a method for preventing a premature ignition of a cylinder charge in advance of a planned ignition point, which includes the steps of:

providing an internal combustion engine having a crankcase and a cylinder; and adjusting a pressure in the crankcase of the internal combustion engine such that a transport of lubricating oil constituents from the crankcase to a combustion chamber of the cylinder due to a pressure ratio between the crankcase and the combustion chamber of the cylinder of the internal combustion engine is prevented.

In other words, according to the invention, there is provided a method for preventing a premature ignition of a cylinder charge in advance of a planned ignition point in an internal combustion engine, wherein the method includes an adjustment of a pressure in a crankcase of the internal combustion engine in such a way as to prevent a transport of lubricating oil constituents from the crankcase to the combustion chamber due to a pressure ratio between the crankcase and a combustion chamber of a cylinder of the internal combustion engine.

According to another mode of the invention, the step of adjusting the pressure in the crankcase includes adjusting the pressure to a negative pressure of 100-700 mbar relative to an ambient air pressure.

According to a further mode of the invention, the step of adjusting the pressure in the crankcase includes feeding a vacuum from an inlet manifold of the internal combustion engine, wherein the inlet manifold is coupled to the combustion chamber.

According to another mode of the invention, the step of providing the internal combustion engine includes providing the internal combustion engine with an inlet manifold and a compressor, wherein the inlet manifold is coupled to the combustion chamber and wherein the compressor is configured to increase a pressure in the inlet manifold of the internal combustion engine; and the step of adjusting the pressure in the crankcase includes selectively coupling the crankcase fluidically to the inlet manifold or to an intake side of the compressor.

Another mode of the method according to the invention includes, if the pressure in the inlet manifold is less than a pressure on the intake side of the compressor, coupling the crankcase to the inlet manifold in such a manner that the pressure in the crankcase substantially corresponds to a pressure in the combustion chamber when an inlet valve of the cylinder is open.

A further mode of the method according to the invention includes, if a pressure on the intake side of the compressor is less than the pressure in the inlet manifold, coupling the crankcase to the intake side of the compressor.

According to another mode of the invention, the step of adjusting the pressure in the crankcase includes adjusting the pressure by using a valve disposed in a connection between the inlet manifold and the crankcase.

According to a further mode of the invention, the step of adjusting the pressure in the crankcase includes adjusting the pressure by using a vacuum pump.

Another mode of the method according to the invention includes, in addition to adjusting a pressure in the crankcase, also adjusting an ignition point for the cylinder of the internal combustion engine in a given operating range of the internal combustion engine such that an adjusted ignition point brings about a knocking combustion in the cylinder.

In the context of the present invention it was established that under certain particularly critical operating conditions premature ignitions can occur if deposits and lubricating oil constituents are present in the combustion chamber. Depending on engine boundary conditions, however, there is a general tendency for deposits to form and for lubricating oil constituents to be transported into the combustion chamber. For example, in a spark-ignition engine a so-called quantity control is used for load control. This means that a small fresh air charge is needed in the case of a lower power or torque output, and accordingly a large fresh air charge in the case of a high power or torque output. Here the cylinder charge is adjusted via the inlet manifold pressure. At low loads, for example, the inlet manifold absolute pressure may be reduced to as little as 250 mbar. Accordingly this pressure also prevails in the combustion chamber as long as the inlet valves are open. In the cylinder crankcase, on the other hand, a pressure closely approximating to the ambient air pressure prevails and at low engine loads a pressure gradient can therefore occur between the crankcase and the combustion chamber. As a result lubricating oil may be transported out of the crankcase into the combustion chamber.

As explained above, according to the present invention a method is provided for preventing a premature ignition of a cylinder charge in advance of a planned ignition point in an internal combustion engine. In the method a pressure is adjusted in a crankcase of the internal combustion engine in such a way as to prevent a transport of lubricating oil constituents from the crankcase to the combustion chamber due to a pressure ratio (pressure relationship) between the crankcase and a combustion chamber of a cylinder of the internal combustion engine. In other words, the pressure in the crankcase of the internal combustion engine is adjusted in such a way that a transport of lubricating oil constituents from the crankcase into the combustion chamber is substantially prevented. The combustion chamber is sealed off from an internal space of the crankcase by the piston and the piston rings. This seal is not absolutely tight, however, so that during the compression stroke and the power stroke of the cylinder, for example, air, fuel or exhaust gases can be forced into the crankcase. This effect is also referred to as the blow-by effect. Conversely it is possible during an intake stroke, for example, for lubricating oil constituents, which are present in the crankcase in order to lubricate the internal combustion engine, to get into the combustion chamber despite the seal. This transport of lubricating oil constituents from the crankcase into the combustion chamber can be assisted by the presence of a higher pressure in the crankcase than in the combustion chamber. At low loads of the internal combustion engine the absolute inlet manifold pressure may fall to 250 mbar, for example. This pressure also prevails in the combustion chamber when the inlet valve is open. In order to prevent lubricating oil constituents passing from the crankcase into the combustion chamber along the inside wall of the cylinder, past the piston rings, a correspondingly lower pressure must be set in the crankcase. By preventing lubricating oil constituents from getting into the combustion chamber, it is possible to reduce premature ignitions due to these lubricating oil constituents. In addition, the lubricating oil constituents may form deposits in the combustion chamber, which in turn increase the tendency to premature ignition. By preventing the transport of lubricating oil constituents from the crankcase into the combustion chamber, it is also possible, therefore, to reduce the formation of deposits in the combustion chamber.

According to an embodiment of the invention, the pressure in the crankcase can be set to a negative pressure in the range from 100 to 700 mbar, relative to an ambient pressure outside the internal combustion engine. The vacuum setting can be correspondingly adjusted as a function of an operating state, for example, and in particular as a function of a pressure in the inlet manifold of the internal combustion engine. For example, the pressure in the crankcase can be adjusted to substantially the same pressure as that which prevails in the combustion chamber when the inlet valve of the cylinder is open. Essentially, this means, for example, that the pressure in the crankcase does not deviate by more than 10% from the pressure in the combustion chamber when the inlet valve of the cylinder is open. The pressure in the crankcase can be adjusted, for example, by feeding a vacuum from the inlet manifold of the internal combustion engine, coupled to the combustion chamber, to the crankcase. It should be ensured here that the feed is of sufficient magnitude to achieve a correspondingly rapid pressure change in the crankcase even in the event of a rapid pressure change in the inlet manifold. For example, an oil separator, which is provided in the connection between the crankcase and the inlet manifold in order to prevent a transport of lubricating oil from the crankcase into the inlet manifold, must be dimensioned in such a way that a variation in the vacuum in the inlet manifold also leads, within the shortest possible time, to a corresponding variation in the pressure in the crankcase, since otherwise there is a risk that during this time lubricating oil constituents will pass from the crankcase into the combustion chamber due to the higher pressure in the crankcase.

According to an embodiment of the invention, the internal combustion engine includes a compressor, which is driven by an exhaust gas turbocharger, for example, and which is configured to increase a pressure in the inlet manifold of the internal combustion engine coupled to the combustion chamber. In order to adjust the pressure in the crankcase in such a way as to prevent a transport of lubricating oil constituents from the crankcase to the combustion chamber due to a pressure ratio between the crankcase and the combustion chamber, the crankcase has an air-flow coupling (fluid coupling) selectively either to the inlet manifold or to an intake side of the compressor. If the pressure in the inlet manifold is less than the pressure on the intake side of the compressor, the crankcase is coupled to the inlet manifold in such a way that the pressure in the crankcase substantially corresponds to the pressure in the combustion chamber of the cylinder when the inlet valve of the cylinder is open. If the pressure on the intake side of the compressor is less than the pressure in the inlet manifold, the crankcase is coupled to the intake side of the compressor. It is therefore possible to ensure that the lowest possible pressure always prevails in the crankcase, i.e. that the greatest possible vacuum prevails in the crankcase, so that a transport of lubricating oil constituents from the crankcase to the combustion chamber can be effectively prevented.

The adjustment of the pressure in the crankcase may be performed through the use of a valve, which is disposed in a connection between the inlet manifold and the crankcase or between the intake side of the compressor and the crankcase. The valve serves to adjust the pressure in the crankcase, for example as a function of an operating state of the internal combustion engine. The valves may also include non-return valves.

According to a further embodiment of the invention, the pressure in the crankcase can be adjusted through the use of a vacuum pump. The pressure in the crankcase can thereby be adjusted without influencing the pressure in the inlet manifold or on the intake side of the compressor.

With the objects of the invention in view there is also provided, a method for preventing a premature ignition of a cylinder charge in advance of a planned ignition point, which includes the steps of:

providing an internal combustion engine having a cylinder; and adjusting an ignition point for the cylinder of the internal combustion engine in a given operating range of the internal combustion engine such that an adjusted ignition point brings about a knocking combustion in the cylinder.

In other words, according to the invention, there is also provided a method for preventing a premature ignition of a cylinder charge in advance of a planned ignition point in an internal combustion engine, wherein the method includes an adjustment of an ignition point for a cylinder of the internal combustion engine in a specific operating range of the internal combustion engine in such a way that the adjusted ignition point brings about a knocking combustion in the cylinder.

According to another mode of the invention, the given operating range includes an operating range in a medium load range of the internal combustion engine.

Another mode of the method according to the invention includes determining a probability of an occurrence of a premature ignition as a function of operating parameters of the internal combustion engine; and adjusting the ignition point for the knocking combustion for a given period or at given time intervals in dependence on the probability.

Another mode of the method according to the invention includes, in addition to adjusting the ignition point, adjusting a pressure in a crankcase of the internal combustion engine such that a transport of lubricating oil constituents from the crankcase to a combustion chamber of the cylinder due to a pressure ratio between the crankcase and the combustion chamber of the cylinder of the internal combustion engine is prevented. In other words, the method steps relating to the adjustment of the pressure in the crankcase can be combined with the method steps relating to the adjustment of the ignition point.

As explained above, according to the present invention a further method is provided for preventing a premature ignition of a cylinder charge in advance of a planned ignition point in an internal combustion engine. In the method an ignition point for a cylinder of the internal combustion engine is adjusted in a specific operating range of the internal combustion engine, in such a way that the set ignition point brings about a knocking combustion in the cylinder. The knocking combustion serves to remove deposits, which have been deposited in the combustion chamber of the cylinder and which can lead to a premature ignition. The knocking combustion gives rise to mechanical movements or vibrations, which can assist in detaching deposits in the combustion chamber and removing them from the combustion chamber with the exhaust gases. In other words, the internal combustion engine is operated in such a way that shocks occur in the combustion chamber of the internal combustion engine, which can lead to deposits being shaken or knocked off. The specific operating range may be selected in such a way that the knocking combustion is not experienced as unpleasant by a driver of the vehicle. For example, the specific operating range may include a medium load range of the internal combustion engine, for example. In addition, the specific operating range may be selected in such a way that increased wear of the internal combustion engine due to the knocking combustion in this specific operating range is substantially avoided.

According to an embodiment of the method, a probability of a premature ignition occurring is furthermore determined as a function of operating parameters of the internal combustion engine, and the ignition point for the knocking combustion is adjusted as a function of this probability for a specific period or at specific time intervals. Specific operating parameters of the internal combustion engine, for example frequent cold-starting, poor fuel or operating states in which lubricating oil constituents get into the combustion chamber, may lead to the increased formation of deposits in the combustion chamber. This may increase the probability of premature ignition occurring. These deposits can be removed by adjusting the ignition point for the knocking combustion. It is possible, for example, to vary a time interval between such set knocking combustions according to the probability of premature ignition occurring or the probability of deposits forming, and to set the knocking combustion for a specific period of a few seconds, for example.

Although the methods described above have been described as individual embodiments, it is clear that the embodiments of the described methods can be combined with one another in order to prevent a premature ignition of a cylinder charge.

With the objects of the invention in view there is furthermore provided, an internal combustion engine, including:
a crankcase;
a cylinder with a combustion chamber; and
a device for preventing a premature ignition of a cylinder charge in advance of a planned ignition point, the device being configured to adjust a pressure in the crankcase in such a way as to prevent a transport of lubricating oil constituents from the crankcase to the combustion chamber due to a pressure ratio between the crankcase and the combustion chamber of the cylinder of the internal combustion engine.

In other words, according to the invention, there is provided an internal combustion engine having a device for preventing a premature ignition of a cylinder charge in advance of a planned ignition point in the internal combustion engine, wherein the device is configured to adjust a pressure in a crankcase of the internal combustion engine in such a way as to prevent a transport of lubricating oil constituents from the crankcase to a combustion chamber due to a pressure ratio between the crankcase and the combustion chamber of a cylinder of the internal combustion engine.

According to another feature of the invention, an inlet manifold coupled to the combustion chamber is provided, wherein the inlet manifold is configured to feed a vacuum for adjusting the pressure in the crankcase.

According to yet another feature of the invention, a compressor configured to increase a pressure in the inlet manifold is provided, wherein the compressor has an intake side coupled to the crankcase, and wherein the crankcase is selectively coupled fluidically to the inlet manifold or to the intake side of the compressor.

According to a further feature of the invention, a connection between the inlet manifold and the crankcase is provided; a valve is disposed in the connection between the inlet manifold and the crankcase, the valve is configured to adjust the pressure in the crankcase.

According to another feature of the invention, a vacuum pump is provided which is configured to adjust the pressure in the crankcase.

As explained above, according to the present invention an internal combustion engine is provided, which has a device for preventing a premature ignition of a cylinder charge in advance of a planned ignition point in the internal combustion engine. The device is capable of adjusting a pressure in a crankcase of the internal combustion engine in such a way as to prevent a transport of lubricating oil constituents from the crankcase to a combustion chamber due to a pressure ratio between the crankcase and the combustion chamber of a cylinder of the internal combustion engine. The internal combustion engine may furthermore be configured to perform the method previously described and therefore also affords the advantages previously described.

With the objects of the invention in view there is also provided, an internal combustion engine, including:
a cylinder; and
a device for preventing a premature ignition of a cylinder charge in advance of a planned ignition point, the device being configured to adjust an ignition point for the cylinder in a given operating range of the internal combustion engine such that an adjusted ignition point brings about a knocking combustion in the cylinder.

As defined above, according to the invention an internal combustion engine is provided, which has a device for preventing a premature ignition of a cylinder charge in advance of a planned ignition point in the internal combustion engine. The device is configured to adjust an ignition point for a cylinder of the internal combustion engine in a specific operating range of the internal combustion engine in such a way that the set ignition point brings about a knocking combustion in the cylinder. The internal combustion engine may furthermore be suited to performing the method previously described and therefore also affords the advantages previously described.

With the objects of the invention in view there is furthermore provided, a vehicle having an internal combustion engine including a crankcase, a cylinder with a combustion chamber, and a device for preventing a premature ignition of a cylinder charge in advance of a planned ignition point, wherein the device for preventing a premature ignition is configured to adjust a pressure in the crankcase in such a way as to prevent a transport of lubricating oil constituents from the crankcase to the combustion chamber due to a pressure ratio between the crankcase and the combustion chamber of the cylinder of the internal combustion engine.

With the objects of the invention in view there is also provided, a vehicle having an internal combustion engine including a cylinder and a device for preventing a premature ignition of a cylinder charge in advance of a planned ignition point in the internal combustion engine, wherein the device for preventing a premature ignition is configured to adjust an ignition point for the cylinder in a given operating range of the internal combustion engine such that an adjusted ignition point brings about a knocking combustion in the cylinder.

Thus, according to the present invention a vehicle is provided, having an internal combustion engine as defined above. The internal combustion engine may, in particular, involve a highly supercharged internal combustion engine, so that the vehicle has a low fuel consumption. Providing the internal combustion engine with a device for preventing a premature ignition serves to increase the durability of the internal combustion engine.

Other features which are considered as characteristic for the invention are set forth in the appended claims.

Although the invention is illustrated and described herein as embodied in a method for preventing a premature ignition in an internal combustion engine and embodied in an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
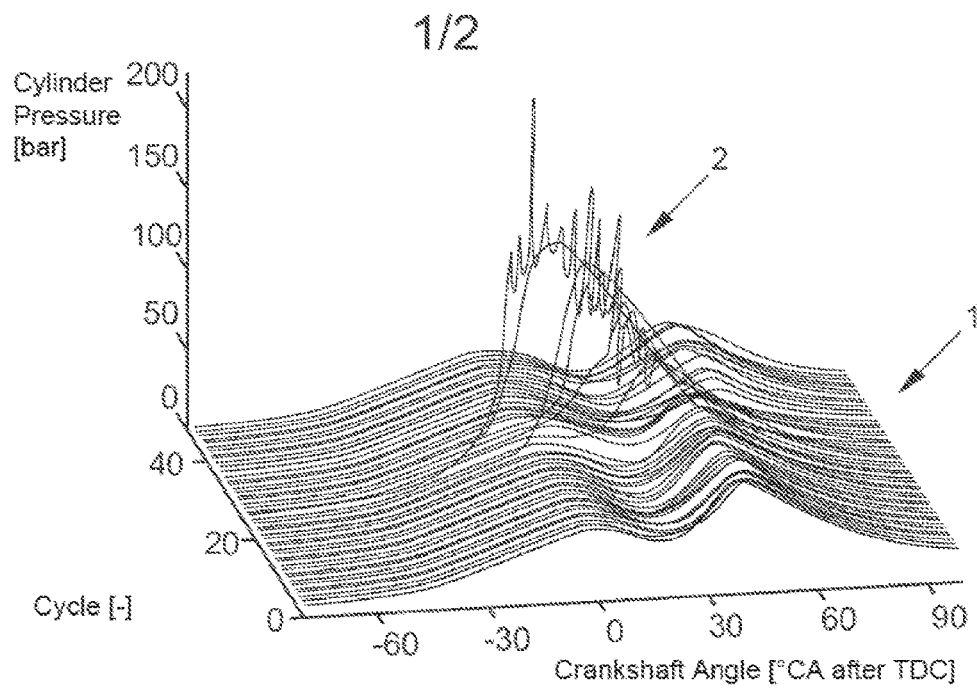
FIG. 1 is a graph illustrating cylinder pressure profiles of regular combustion processes and combustion processes with premature ignition.
Figure 2:
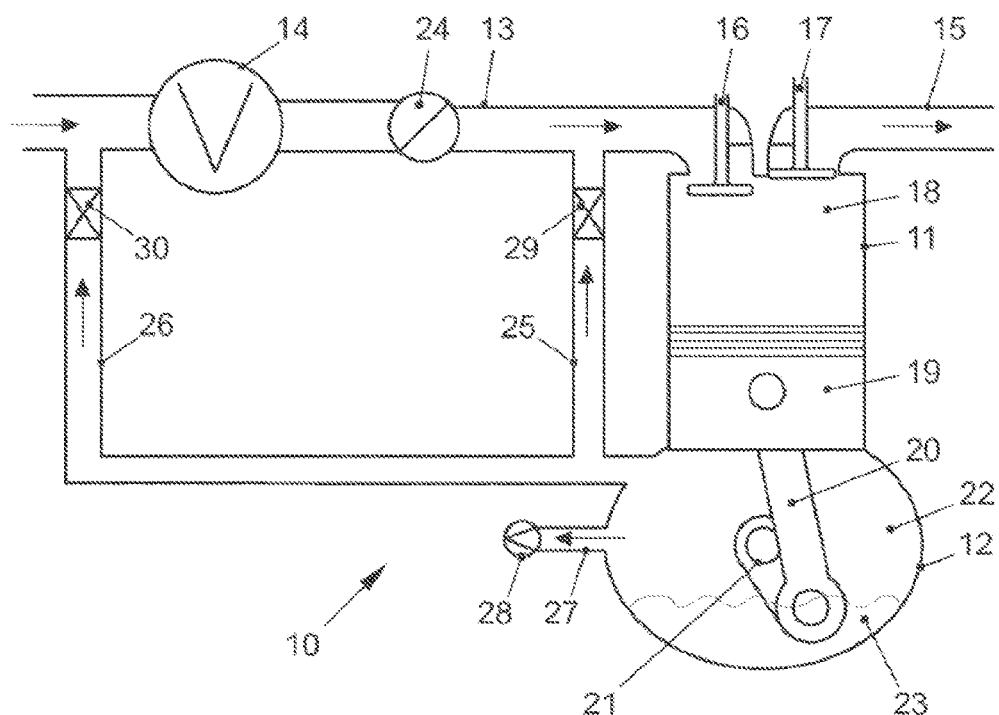
FIG. 2 is a schematic view of an internal combustion engine according to an embodiment of the invention.

Referring now to the figures of the drawings in detail and first, particularly, to FIG. 2 thereof, there is shown an internal combustion engine 10 having a cylinder 11, a crankcase 12, an inlet manifold 13, a compressor 14 and an exhaust gas pipe 15. An inlet valve 16 and an exhaust valve 17 are disposed in a cylinder head of the cylinder 11. A piston 19, which via a connecting rod 20 drives a crankshaft 21 of the internal combustion engine 10, is provided in a combustion chamber 18 of the cylinder 11. The crankshaft 21 is situated in an internal space 22 of the crankcase 12. Also present in the internal space 22 is a lubricating oil 23, which is pumped into the internal combustion engine by an oil pump for lubricating moving parts of the internal combustion engine 10. A throttle valve 24, which for controlling the load of the internal combustion engine 10 adjusts a quantity of fresh air that is delivered to the cylinder 11, is disposed in the inlet manifold 13. The internal combustion engine 10 includes further components, such as fuel injection valves and a spark plug, for example, which have been omitted from FIG. 2, however, for reasons of clarity. Depending on engine boundary conditions of the internal combustion engine 10, lubricating oil constituents of the lubricating oil 23 may be transported from the crankcase 12 into the combustion chamber 18 when the internal combustion engine is in operation. This can occur particularly when the pressure in the internal space 22 of the crankcase 12 is greater than the pressure in the combustion chamber 18 of the cylinder 11. Lubricating oil constituents in the combustion chamber 18 can lead to a premature ignition or may form deposits, which in turn may encourage premature ignition.

In order to prevent lubricating oil constituents passing from the internal space 22 of the crankcase 12 into the combustion chamber 18 of the cylinder 11 and therefore in order to prevent a premature ignition, the internal combustion engine 10 includes a fluid connection 25, which couples the internal space 22 of the crankcase 12 to an internal space of the inlet manifold 13. The internal combustion engine 10 further includes a fluid connection 26, which connects the internal space 22 of the crankcase 12 to an intake side of the compressor 14. Finally the internal combustion engine 10 includes a further fluid connection 27, which is coupled to a vacuum pump 28. An oil separator can be provided at each of the junctions between the fluid connections 25-27 and the internal space 22 of the crankcase 12, in order to prevent lubricating oil 23 from being transported through the fluid connections 25-27. The fluid connections 25-27 serve to build up a vacuum in the internal space of the crankcase 12. Through the use of the pump 28, for example, it is possible to set a constant vacuum, or a vacuum that varies as a function of an operating point of the internal combustion engine 10, in the internal space 22 of the crankcase 12. The vacuum may be adjusted in such a way, for example, that on an intake stroke of the internal combustion engine 10 the pressure in the internal space 22 of the crankcase 12 substantially corresponds to the pressure in the internal space 18 or is only slightly greater than this, for example no more than 100 mbar greater than the pressure in the combustion chamber 18. Since the pressure in the inlet manifold 13 when the inlet valve 16 is open substantially corresponds to the pressure in the combustion chamber 18, it is possible, via the fluid connection 25, also to generate a pressure in the internal space 22 of the crankcase 12 which substantially corresponds to the pressure in the combustion chamber 18 or which is only slightly greater than this, for example no more than 100 mbar. In order to be able to adjust the pressure in the crankcase 12 as rapidly as possible to varying pressure ratios or pressure conditions in the inlet manifold 13, the fluid connection 25 has a suitable diameter of 8-10 mm, for example. A vacuum can furthermore be built up in the crankcase 12 via the fluid connection 26, even if the pressure in the inlet manifold 13 is increased through the use of the compressor 14. Valves 29 and, respectively, 30 may additionally be disposed in the fluid connections 25 and 26, in order to set a suitable pressure in the crankcase 12. The valves 29 and 30 may be non-return valves, for example, which only allow a flow of fluid in the fluid connections 25 and 26 in the direction of the arrow. Alternatively the valves 29 and, respectively, 30 may be adjustable valves, for example timing valves, in order to adjust a pressure in the crankcase 12 between the inlet manifold pressure and the ambient pressure, for example. This may be advantageous in the case of highly dynamic sequences, for example, in which the crankcase pressure does not have to be adjusted to the inlet manifold pressure. By adjusting the pressure in the crankcase 12 via the fluid connections 25-27 in such a way that a transport of lubricating oil constituents from the crankcase 12 to the combustion chamber 18 is substantially prevented, it is possible to prevent a premature ignition in the cylinder 11.

The internal combustion engine 10 may include all three fluid connections 25-27 or just one or any combination of the fluid connections 25-27.

Figure 3:
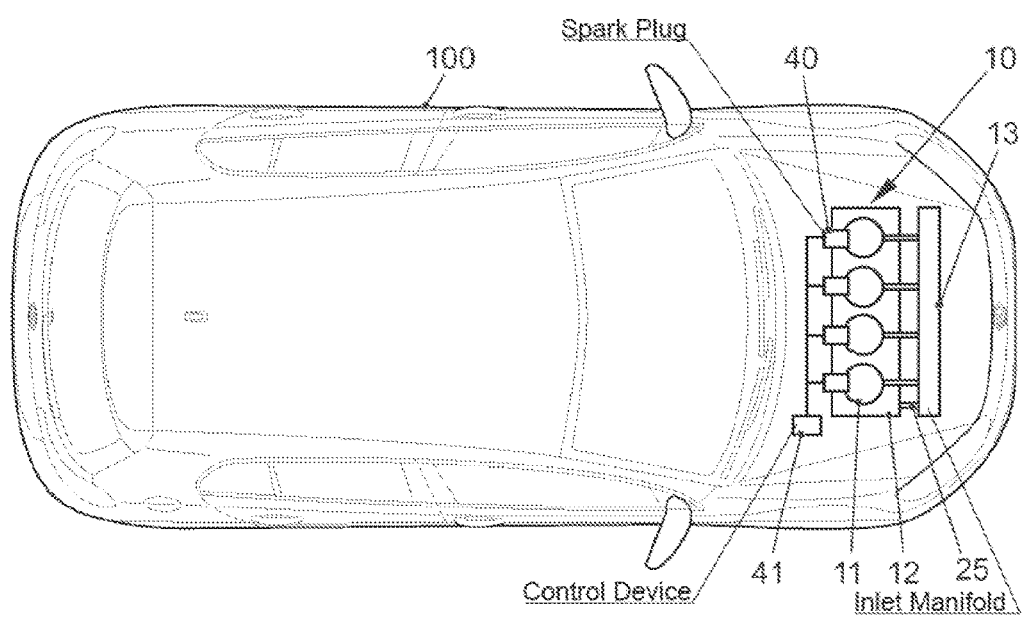
FIG. 3 is a schematic view of a vehicle according to an embodiment of the invention.

FIG. 3 shows a vehicle 100 having the internal combustion engine 10 in FIG. 2. The internal combustion engine 10 includes multiple cylinders 11, which are coupled to an inlet manifold 13 for supplying fresh air. The internal space of the crankcase 12 is coupled by the fluid connection 25 to the inlet manifold 13, in order to set a pressure in the crankcase 12 that substantially corresponds to the pressure in the inlet manifold 13. This serves to prevent lubricating oil constituents passing from the crankcase 12 into the combustion chamber 18 of the cylinder 11, and therefore to prevent a premature ignition in the cylinders 11.

The internal combustion engine 10 further includes spark plugs 40, which are capable of initiating a combustion of a fuel-air mixture in the cylinders 11 with an ignition spark. The spark plugs 40 are coupled to a device 41, for example an ignition system. In normal operation of the internal combustion engine 10 the ignition point of the spark plugs 40 is set so that the build-up of pressure occurring due to the combustion of the fuel air mixture in the combustion chamber of the cylinder 11 begins to drive the piston 19 at or shortly after the top dead center. If the ignition point is advanced, the piston 19 is already subjected to pressure before reaching the top dead center, with the result that the combustion becomes inefficient and engine wear may be increased. In addition, such premature ignition may be accompanied by knocking noises, which may be perceived as unpleasant or intrusive by a driver of the vehicle 100. A premature ignition is therefore generally avoided. Such premature ignition is also referred to as knocking combustion. Increased wear of the internal combustion engine 10 due to knocking combustion generally occurs at high loads and/or high engine speeds. At medium or low loads and at medium engine speeds knocking combustion can be performed without sustaining increased wear of the internal combustion engine 10. The knocking combustion generates vibrations in the internal combustion engine 10, which can help to detach or loosen deposits in the combustion chamber, for example on side walls of the cylinder 11, on the piston 19 or in the cylinder head or on the valves 16, 17, and to remove them from the combustion chamber on the next exhaust stroke of the cylinder 11. In specific operating states of the internal combustion engine 10, therefore, the control device 41 occasionally activates the spark plugs in such a way that knocking combustion occurs, so that deposits are removed. The control device 41 preferably performs this knocking combustion in the operating states of the internal combustion engine 10 in which the knocking combustion does not have any negative effects on the internal combustion engine 10. Furthermore, the device 41 may perform the knocking combustion with a frequency or a duration depending on the probability of deposits having formed in the combustion chamber 18 of the cylinder 11. For this purpose the device 41, for example, may observe an operating profile of the internal combustion engine 10, or may monitor a fuel quality, for example.

The invention claimed is:

1. A method for preventing a premature ignition of a cylinder charge in advance of a planned ignition point, the method which comprises:
   providing an internal combustion engine having a cylinder;
   determining at least one of a cold-starting frequency and a poor fuel quality;
   determining a probability of an occurrence of a premature ignition as a function of operating parameters of the internal combustion engine, wherein the operating parameters include at least one of the cold-starting frequency and the poor fuel quality; and
   adjusting an ignition point for the cylinder of the internal combustion engine in a given operating range of the internal combustion engine such that an adjusted ignition point brings about a knocking combustion in the cylinder, wherein the ignition point is adjusted for the knocking combustion for a given period or at given time intervals in dependence on the probability.

2. The method according to claim 1, wherein the given operating range includes an operating range in a medium load range of the internal combustion engine.

3. The method according to claim 1, which comprises adjusting a pressure in a crankcase of the internal combustion engine such that a transport of lubricating oil constituents from the crankcase to a combustion chamber of the cylinder due to a pressure ratio between the crankcase and the combustion chamber of the cylinder of the internal combustion engine is prevented.

4. An internal combustion engine, comprising:
   a cylinder; and
   a device for preventing a premature ignition of a cylinder charge in advance of a planned ignition point, said device being configured to adjust an ignition point for said cylinder in a given operating range of the internal combustion engine such that an adjusted ignition point brings about a knocking combustion in said cylinder, wherein said device determines a probability of an occurrence of a premature ignition as a function of operating parameters of the internal combustion engine, wherein the operating parameters include at least one of a cold-starting frequency and a poor fuel quality, wherein the ignition point is adjusted for the knocking combustion for a given period or at given time intervals in dependence on the probability, wherein at least one of the cold-starting frequency and the poor fuel quality is determined prior to determining the probability of an occurrence of a premature ignition.

* * * * *